March 6, 1928.  
E. H. REMDE  
1,661,626  
INDUSTRIAL TRUCK  
Original Filed May 4, 1923     3 Sheets-Sheet 2
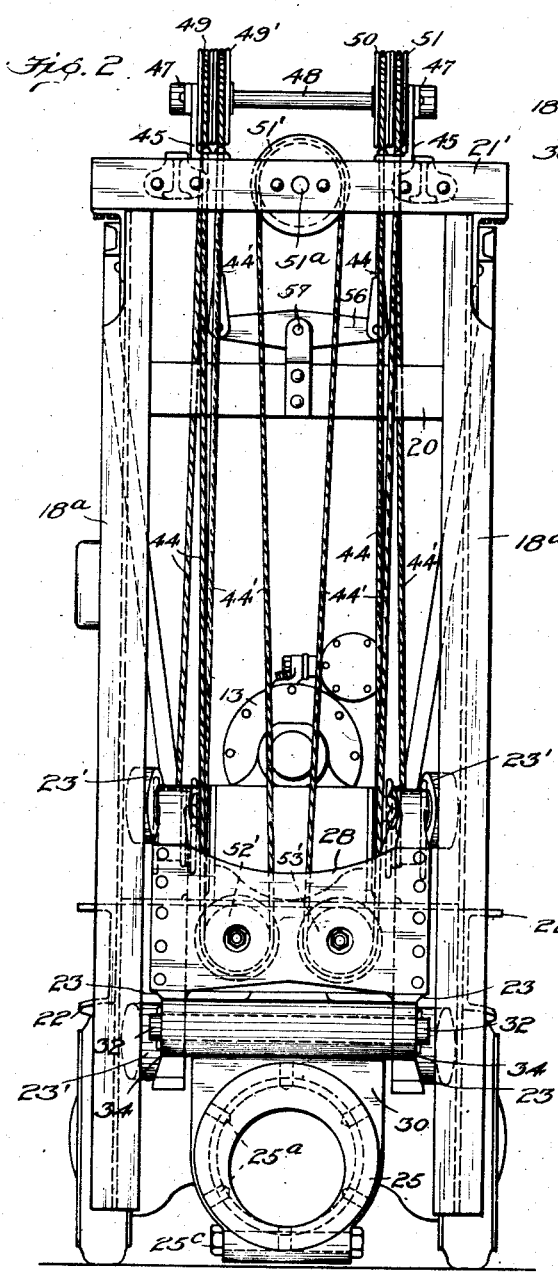
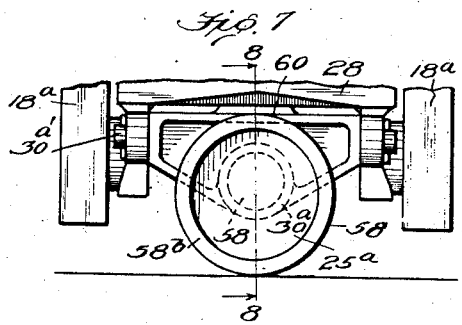
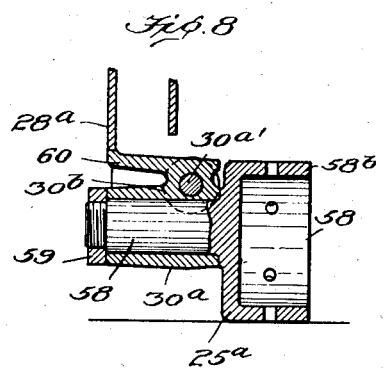
INVENTOR  
Edward H Remde  
By Edward R. Alexander  
ATTORNEY

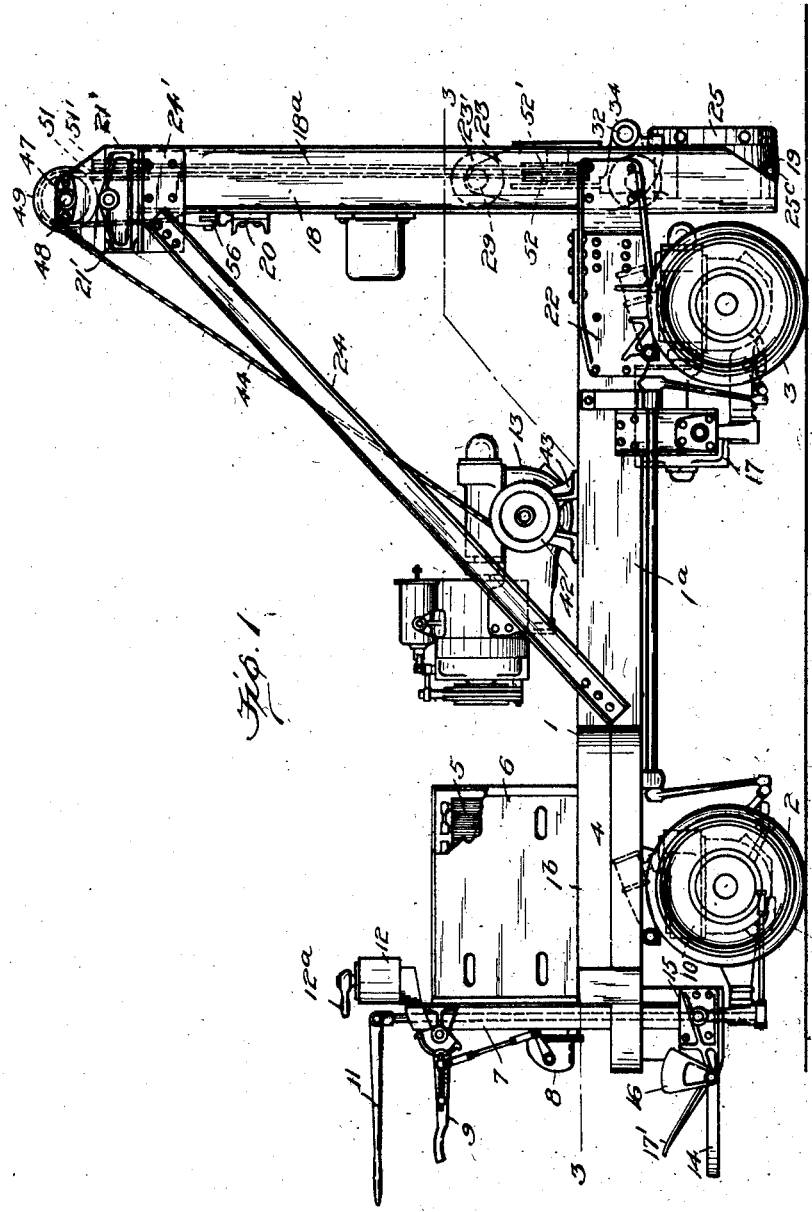

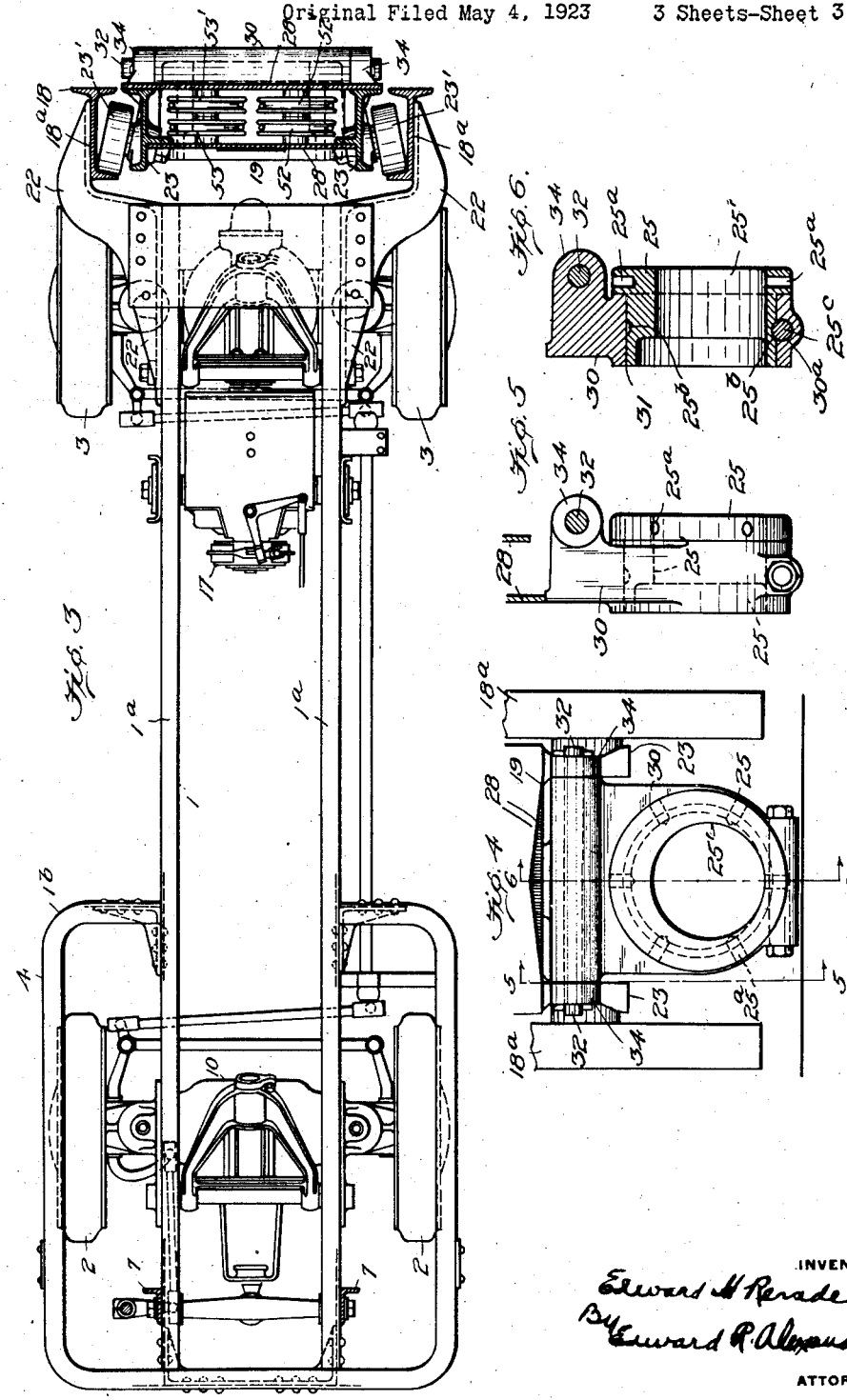

Patented Mar. 6, 1928.

1,661,626

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Original application filed May 4, 1923, Serial No. 636,638. Divided and this application filed February 23, 1926. Serial No. 89,968.

This invention relates to an industrial truck adapted to transport bodies from place to place.

One object of the invention is to construct a truck of this character capable of readily engaging a body or bodies to be transported from place to place.

Another object of the invention is to construct an improved elevating truck having an adjustable body engaging and lifting member capable of being readily positioned to engage a body without moving the truck.

Another object of the invention is to provide an improved lifting member capable of fitting over or enveloping a portion of the body to be lifted, whereby it may be engaged and moved.

Other objects of the invention will be apparent to those skilled in the art to which my invention relates from the following description taken in connection with the accompanying drawings, wherein Figure 1 is a side elevation of a truck embodying my invention.

Figure 2 is an end view looking toward the left of Figure 1.

Figure 3 is a section on the line 3—3 of Figure 1.

Figure 4 is a fragmentary elevational view.

Figure 5 is a section on the line 5—5 of Figure 4.

Figure 6 is a section on the line 6—6 of Figure 4.

Figure 7 is a fragmentary view showing a slightly different form of construction embodying my invention.

Figure 8 is a section on the line 8—8 of Figure 7.

In the drawings, 1 indicates a frame suitably supported on wheels, 2, 3, preferably two pairs of wheels—see Figure 3. The frame 1 may be of any desired construction, but it preferably consists of a pair of parallel channel bars 1ª and a supplemental frame 1ᵇ forming side sections 4 which extend laterally to a point substantially coincident with the plane of the outer extremities of the wheels 2, to provide guards therefor, as well as a relatively wide base or platform for a plurality of batteries 5. The batteries 5 may be housed within a suitable casing 6. 7 indicates a pair of uprights secured to the bars 1ª adjacent one end or wall of the frame 1ᵇ and serving as rigid supports for suitable brackets or plates for the controlling devices, to wit, a controller 8 and its operating handle 9 for operating a traction or driving motor 10, a steering lever 11 and a controller 12 for the hoisting or elevating motor 13. In the drawings, for illustrative purposes, one pair of wheels is driven and both pairs of wheels are steerable, but it will be understood that such arrangement may be variously changed at will so that either or both pairs of wheels may be driven and either pair steered.

14 indicates a platform for the operative, while operating the truck, to stand on and to actuate the lever 11, handle 9 and the handle 12ª for the controller 12. The platform 14 may be pivoted on a rod supported by a pair of depending brackets 15. The platform 14 may be counterbalanced by a weight 16 to maintain it in upright position when not in use. 17 indicates a brake for the truck, preferably operatively connected with an element driven by the motor 10. The brake 17 is controlled by a pedal 17' associated with the platform 14.

18 indicates a guide frame for an elevating member 19, preferably arranged at that end of the frame 1 opposite to the platform 14 and the truck controlling devices.

The guide frame section 18 preferably comprises a pair of channel or I-beams 18ª, rigidly maintained in spaced, parallel relation by a cross member 20 arranged intermediate their ends, a sill 21 disposed at the upper ends of the beams 18ª and connections with the main frame 1 of the construction later to be described. The guide frame 18 preferably extends below the frame 1 to a point adjacent the ground or floor and thereabove to provide sufficient vertical movement for the elevating member 19, to adapt the truck to varying uses and applications. The guide frame 18 is preferably connected to the main frame 1 by a pair of brackets 22, each riveted at its opposite ends to the frame 1 and the adjacent I-beam 18ª. As shown in the drawings, the side walls or flanges of the beams 18ª serve as guides for shoes 23, which are supported between the beams 18ª and form a part of the elevating member 19. 24 indicates a pair of tie rods or bars extending between and connected at their opposite ends to the upper ends of the beams 18ª, or angle plates 24' secured thereto, and the frame 1 and serving to brace the guide frame 18 against movement relative to the main frame 1, due to the weight of the load which at any time may be supported on the engaging and lifting member or device 25, to be later referred to. The sill 21 preferably comprises a pair of channel bars 21', 21', supported upon and secured to the angle plates 24', each of which is secured to the outer side of one of the I-beams 18ª, in a well known manner. The sill 21 serves to support certain elements of a hoisting or elevating mechanism 26, to which reference will later be made.

The elevating member 19 comprises a pair of shoes 23, already referred to, connected together by a pair of spaced front and rear plates 28 and upper and lower pairs of shoe devices 23', one device of each pair being carried by one of the shoes 23 and engaging the inner opposing side walls of the adjacent beam 18ª. Each shoe device 23' consists of a roller loosely mounted on a stud shaft 29 supported in the wall of the adjacent shoe 23. The shafts 29 are inclined so that the surfaces of the rollers may engage the inclined inner surfaces of the side walls of the adjacent beam 18ª and roll thereon with minimum friction. As will be understood from Figures 2 and 3, the stud shafts 29 carried by each shoe 23 are inclined at an angle relative to each other and are offset relative to the central longitudinal plane of the adjacent beam 18ª, so that the lower roller will engage the rear side wall of the beam and the upper roller will engage its front side wall.

The device 25 is arranged to engage a body or bodies to be transported or loaded and unloaded to or from a support or pile or engaged, elevated and transported to some station and lowered.

In the form of construction herein shown, the device 25 is of hollow form, enabling it to fit over or envelope one end or an exposed portion of the body to be lifted or moved. The wall of the device may be constructed to form an opening 25' of any desired shape according to the construction or shape of the body to be engaged, but when the body to be engaged, lifted and transported consists of a roll such as used in a rolling mill, the opening is round, as shown in the drawings, so as to receive one end of the roll when the truck is driven toward it as will later be set forth.

The device 25 is carried by a supporting element 30, which in turn is trunnioned on the elevating member 19 in the manner to be later described.

The lifting device 25 is rotatably fitted at its inner end into an opening 31 formed in the supporting element 30. The supporting element 30 is provided at its opposite sides with trunnions 32, which rotatably fit suitable openings 33 formed in a pair of forwardly projecting arms 34, each integrally connected to one of the shoes 23. By preference, the trunnions constitute a single rod extending through openings formed in the supporting element 30. The trunnions 32 serve to removably support the lifting device on the elevating member 19 and also permit it to swing outwardly and upwardly, so that during the lowering movement of the load, if anything happens to be below the latter, it may swing upwardly about the trunnions and thus eliminate danger of breakage or distortion of any part of the elevating member, lifting device or other parts of the truck. As clearly shown in Figure 5, the supporting element 30 extends inwardly beyond the axis of the trunnions 32, so that its inner end may engage the lower edge of the inner connecting plate 28 to maintain the lifting device in substantially horizontal position or against movement inwardly.

As will be noted from Figs. 2 and 4, the opening 25' is eccentric to the outer wall of the device 25 or opening 31, so that by rotating the device 25 in the opening 31 relative to the supporting element 30, the opening may be adjusted to any desired position.

In the operation of the truck to cause engagement of the lifting device with the body to be lifted, the elevating member is raised or lowered to position the lifting device at the same height as the body; then the truck is driven toward the body to be lifted and in close proximity thereto. If it is found that the lifting device is not positioned to receive the body, it is adjusted, that is, rotated in the supporting member 30, and the elevating member adjusted up or down, until the opening 25' is in registry with the body; then the truck is driven forwardly thereby causing the lifting device to envelope or fit over the body end or an exposed portion thereof, whereupon the elevating member is raised and the truck backed and driven to the desired location.

From the foregoing description it will be seen that the lifting device may be adjusted in a ready manner into alignment with the body to be engaged and lifted without moving the truck. The construction not only facilitates the operations, but enables the lifting device to engage and lift bodies the exposed portions of which are relatively short and small.

The rotation or adjustment of the lifting device 25 may be effected by inserting a tool in one of the openings 25ª formed in that portion of its wall extending beyond the supporting member 30.

At 25ᵇ, the outer wall of the lifting device 25 is formed with an annular groove which forms a key-way for a bolt 25ᶜ extending through a transverse opening 30ª, formed in the supporting element 30. This construction serves to removably maintain the lifting device 25 in the supporting element 30, while permitting it to be rotated in the manner already set forth.

The hoisting and elevating mechanism 26 is connected to the elevating member 19 and serves to raise the latter to any desired elevation within the limits of the guide beams 18ª and to lower the same. The operating means for the hoisting and elevating mechanism preferably include an electric motor 13, already referred to, and winding drums 42 driven thereby. The motor and drums are mounted on standards 43 which are fixed upon the main frame 1, preferably between the battery casing 6 and the guide frame 18. The drums 42 have connected to them flexible members 44, 44', such as cables— which are operatively connected to the elevating member 19, as will be later described. The elements constituting the operating means herein shown and just referred to are similar in construction to and co-operative like corresponding elements in my co-pending application Serial No. 592,138, filed October 3, 1922, Patent No. 1,567,676, dated December 29, 1925, to which reference may be made, except that, as will be noted in Fig. 1, the standards 43 for the motor supporting cradle are arranged to support the latter and the motor 13 in substantially a horizontal position.

45 indicates hangers mounted on and secured to the channel bars 21', constituting the sill 21. The hangers are provided with suitable bearings 47 which support the opposite ends of a shaft 48. 49, 49', and 50, 50', indicate pairs of sheaves loosely mounted on the shaft 48 and preferably arranged equal distances from a point midway between the guide members 18ª. 51, 51', indicate a pair of sheaves loosely mounted on a shaft 51ª supported at its opposite ends in the channel bars 21' and arranged at right angles to the shaft 48 with its axis in a plane preferably midway between the drums 42. 52, 52', and 53, 53', indicate pairs of sheaves loosely mounted on shafts 54, 55, respectively, disposed at opposite sides of and equal distances from the plane in which the shaft 51ª is supported and supported at their opposite ends in the plates 28. The ropes, cables or flexible members 44, 44', run over and around the sheaves and are adapted to be wound on and from the drums 42, to raise and lower the elevating member 19, together with whatever load is to be carried or transported or moved vertically by the lifting device carried thereby. The rope 44 extends from one drum 42 over the sheave 49, then around the sheave 52 and then over the sheave 51. From the sheave 51, the rope 44 runs around the sheave 53 and then around the sheave 50, its free end being connected to one end of an equalizing element 56, which is pivoted on a pivot 57, preferably disposed in the plane of the shaft 51ª, and supported by the cross bar 20. The other rope 44' extends from the adjacent drum 42 over the sheave 50', then around the sheave 53' and then over the sheave 51'. From the sheave 51' the rope 44' runs around the sheave 52' and then over around the sheave 49', its free end being connected to the opposite end of the equalizing element 56. The operation of winding the ropes 44, 44' on the drums 42 and unwinding them therefrom to raise and lower the elevating member will be readily understood. From the foregoing description, it will be seen that the ropes 44, 44', are wound on and off drums which are disposed at opposite sides of the central longitudinal plane of the truck frame, or a point which is midway between the guide members; also that the rope wound on and off one drum is carried over sheaves which are arranged equal distances from this point and connected to the end of the equalizing element, which is arranged on that side of the central longitudinal plane of the truck remote from the drum. By this arrangement the pull on the ropes incident to raising and lowering the elevating member and its load is equalized so that the force acts simultaneously through the sheaves 52, 52', and 53, 53', and the shafts therefor, to operate the elevating member vertically and in a direction parallel to the guide members 18ª thereby eliminating any tendency to pull on or raise or lower one side of the shoe member faster than the other side. As a result, the elevating member 19 is guided freely between the guides 18ª in its vertical movements without undue friction or binding therein or strains on the elevating mechanism. Furthermore, in winding on and from the drums and running around the guide sheaves, the tension in both ropes is the same, so that they (1) operate uniformly in running over and around the sheaves and (2) wear substantially equally.

In Figs. 7 and 8 I have shown a modified form of construction in which the lifting device indicated at 25ª comprises a shaft or shank 58 rotatably fitting a hub 30ˣ on the supporting member 30ᵇ which is trunnioned at 30ª' on the elevating member, and a socket 58ª having an annular wall 58ᵇ that is eccentric to the axis of the shaft or shank 58. The inner end of the shaft or shank 58 is preferably provided with screw threads to take a nut 59 which engages the adjacent end of the hub 30ˣ to maintain the lifting device on the supporting member, while permitting it to be rotated to effect adjustment of the socket in the manner already set forth in connection with the lifting device 25. 60 indicates an arm on the supporting member 30ᵇ and arranged to engage a part of the elevating member, for example, the rear plate 28 thereof, to support the lifting device against downward movement, but permitting it to swing upwardly.

To those skilled in the art to which my invention relates, many modifications and widely differing embodiments of the invention and applications thereof will suggest themselves without departing from the spirit and scope thereof. The descriptions and the disclosure herein are purely illustrative and are not intended to be in any sense limiting.

This application is a division of my application Serial No. 636,638 filed May 4, 1923.

What I claim is:

1. In apparatus of the class described, the combination of a truck frame having supporting wheels, a guide frame on said truck frame, an elevating member comprising a main portion mounted to slide on said guide frame and a lift device movably mounted on said main portion and provided with load engaging walls arranged to be adjusted transversely of said truck frame when said device is moved relative to said main portion, and means far raising and lowering said elevating member.

2. In apparatus of the class described, the combination of a truck frame having supporting wheels, a guide frame on said truck frame, an elevating member mounted to slide on said guide frame, means for raising and lowering said elevating member, and a lifting device mounted on said elevating member and comprising a hollow body having its axis disposed longitudinally of the truck frame and open at its outer end, whereby it fits over and envelops a portion of the body to be lifted when the truck is driven in one direction.

3. In apparatus of the class described, the combination of a truck frame having supporting wheels, a guide frame on said truck frame, an elevating member mounted to slide on said guide frame, means for raising and lowering said elevating member, and a lifting device rotatably mounted on said elevating member and having an opening to receive a portion of the body to be lifted, the axis of the opening in said device and the axis on which it rotates being eccentric one to the other whereby said device is adjustable relative to said elevating member.

4. An apparatus as claimed in claim 2 in which said hollow body is rotatably mounted on said elevating member.

5. In apparatus of the class described, the combination of a truck frame having supporting wheels, a guide frame on said truck frame, an elevating member mounted to slide on said guide frame, means for raising and lowering said elevating member, a supporting member trunnioned on said elevating member, and a lifting device adjustably mounted on said supporting member.

6. An apparatus as claimed in claim 5 in which the lifting device is rotatably mounted on said supporting member to effect its adjustment.

7. An apparatus as claimed in claim 5 in which the lifting device is mounted to rotate on a longitudinal axis and is provided with an annular wall that is eccentric to the axis about which it rotates.

8. In apparatus of the class described, the combination of a truck frame having supporting wheels, a guide on said frame, an elevating member mounted to slide on said guide frame, means for raising and lowering said elevating member, and a lifting device rotatably mounted on said elevating member and provided with body engaging walls extending in the direction of travel of the truck, said walls being arranged eccentrically to the axis on which said device rotates.

9. In apparatus of the class described, the combination of a truck frame having supporting wheels, a guide frame disposed vertically and supported by said truck frame, a member movable upwardly and downwardly in said guide frame, means carried by said truck frame and connected with said movable member for moving it, and a lift device carried by and projecting laterally from said movable member, said lift device comprising a hollow element open at its outer end to receive the body to be lifted by a thrust movement of the truck frame, whereby the outer surfaces of the body may be engaged.

10. In apparatus of the class described, the combination of a truck frame having supporting wheels, a guide frame disposed vertically and supported by said truck frame, a member movable upwardly and downwardly in said guide frame, means carried by said truck frame and connected with said movable member for moving it, and a lift device carried by and projecting laterally from said movable member, said lift device comprising an annular shaped hollow element open at its outer end to receive the body to be lifted by a thrust movement of the truck frame, whereby the outer surfaces of the body may be engaged.

11. In apparatus of the class described, the combination of a truck frame having supporting wheels, a guide frame disposed vertically and supported by said truck frame, a member movable upwardly and downwardly in said guide frame, means carried by said truck frame and connected with said movable member for moving it, and a lift device removably carried by and projecting laterally from said movable member, said lift device comprising a hollow element open at its outer end to receive the body to be lifted by a thrust movement of the truck frame, whereby the outer surfaces of the body may be engaged.

12. In apparatus of the class described, the combination of a truck frame having supporting wheels, a guide frame disposed vertically and supported by said frame, a member movable upwardly and downwardly on said guide frame, means carried by said truck frame and connected to said member for operating it, and an annular shaped hollow lift element supported by said member and projecting horizontally therefrom and arranged to receive and engage the outer surfaces of a body to be lifted by a thrust movement of the truck frame.

13. In apparatus of the class described, the combination of a truck frame, supporting wheels therefor, a guide frame disposed vertically on said truck frame, a member movable upwardly and downwardly on said guide frame, a laterally projecting lift device rotatably supported by said member, said lift device having an annular wall arranged to engage the lateral surfaces of a body to be lifted, said annular wall being eccentric to the axis of rotation of said device, and means for operating said movable member.

14. In apparatus of the class described, the combination of a truck frame, supporting wheels therefor, a guide frame disposed vertically on said truck frame, a member movable upwardly and downwardly on said guide frame and formed with an opening, a lift device rotatably fitting said opening and provided with an annular wall arranged to engage the lateral surfaces of a body to be lifted, said annular wall being eccentric to the wall of said opening, whereby the rotation of said lift device will adjust its said annular wall, and means for operating said movable member.

15. In apparatus of the class described, the combination of a truck frame, supporting wheels therefor, a guide frame disposed vertically on said truck frame, a member movable upwardly and downwardly on said guide frame, a support trunnioned on said movable member and formed with a horizontally extending opening, and a lift device having an annular body engaging wall rotatably supported in said opening, the wall of said opening and said annular wall being eccentric relative to each other, whereby the rotation of said lift device in said support will adjust said annular wall.

16. In apparatus of the class described, the combination of a frame, wheels adjacent the ends of said frame for supporting it, a guide frame on said frame, a member movable upwardly and downwardly on said guide frame, said guide frame being arranged to support said member outwardly of the wheels at one end of said frame, a lift device rotatably mounted on said member on a longitudinal axis, said lift device having an annular wall eccentric to the axis on which said device rotates arranged to engage the lateral surfaces of the body to be lifted, and means for operating said member upwardly and downwardly on said guide frame.

In testimony whereof, I have hereunto subscribed my name.

EDWARD H. REMDE.